United States Patent
MacChesney et al.

(10) Patent No.: US 6,801,700 B2
(45) Date of Patent: Oct. 5, 2004

(54) OPTICAL FIBER DESIGN FOR SECURE TAP PROOF TRANSMISSION

(75) Inventors: John Burnette MacChesney, Lebanon, NJ (US); Thomas Edward Stockert, Millburn, NJ (US); Patrick William Wisk, Greenbrook, NJ (US); Man Fei Yan, Berkeley Heights, NJ (US)

(73) Assignee: Fitel USA Corp, Norcross, GA (US)

( * ) Notice: Subject to any disclaimer, the term of this patent is extended or adjusted under 35 U.S.C. 154(b) by 182 days.

(21) Appl. No.: 10/128,876

(22) Filed: Apr. 24, 2002

(65) Prior Publication Data

US 2002/0172483 A1 Nov. 21, 2002

Related U.S. Application Data

(60) Provisional application No. 60/290,106, filed on May 10, 2001.

(51) Int. Cl.[7] .............................. G02B 6/02; G02B 6/22
(52) U.S. Cl. ........................ 385/127; 385/101; 398/40
(58) Field of Search ................. 385/126–128, 385/123; 398/40

(56) References Cited

U.S. PATENT DOCUMENTS

| | | | | |
|---|---|---|---|---|
| 4,217,488 A | * | 8/1980 | Hubbard ...................... | 398/40 |
| 4,435,040 A | * | 3/1984 | Cohen et al. ................ | 385/127 |
| 4,482,204 A | * | 11/1984 | Blyler et al. ................ | 385/141 |
| 4,525,026 A | * | 6/1985 | Elion .......................... | 385/141 |
| 4,678,273 A | * | 7/1987 | Vilhelmsson ................ | 385/128 |
| 4,859,024 A | * | 8/1989 | Rahman ..................... | 385/112 |
| 5,067,831 A | * | 11/1991 | Robbins et al. ............. | 385/123 |
| 5,121,460 A | * | 6/1992 | Tumminelli et al. ........ | 385/126 |
| 5,406,641 A | * | 4/1995 | Bigley et al. ............... | 385/141 |
| 5,937,127 A | * | 8/1999 | Zarian et al. ............... | 385/128 |

* cited by examiner

Primary Examiner—Nimeshkumar D. Patel
Assistant Examiner—Peter Macchiarolo
(74) Attorney, Agent, or Firm—Peter V. D. Wilde

(57) ABSTRACT

The specification describes optical fibers that are constructed to prevent theft of optical signals. One construction is designed to block access of the core of the fiber to the "writing" radiation necessary to form a grating tap. In this embodiment the optical fiber cladding is provided with a highly absorbing UV layer. In a variation of this embodiment, one or more additional optical paths are provided in the optical fiber to accommodate monitoring signals. The added optical paths allow monitoring signals to be transmitted in the optical fiber, separate from the information signal, to signal an attempt to breach the outer coating or the cladding of the optical fiber.

A second case of intrusion is addressed by increasing the sensitivity of the optical fiber to microbending loss to the extent that bends in the fiber cause such high attenuation of the signal that the bends do not go undetected at the receiving station.

11 Claims, 5 Drawing Sheets

OPTICAL FIBER DESIGN FOR SECURE TAP PROOF TRANSMISSION

RELATED APPLICATIONS

This application claims the benefit of provisional application No. 60/290,106 filed May 10, 2001, which is assigned to the assignee of the present invention and which is incorporated herein by reference.

FIELD OF THE INVENTION

This invention relates to optical fiber transmission systems, and more particularly to optical fibers that are constructed to prevent theft of optical signals.

BACKGROUND OF THE INVENTION

Unauthorized and undetected tapping of optical signals from optical fiber transmission lines is a concern of a variety of users. Transmission cables, even those carrying highly sensitive information, often extend across substantial lengths of insecure territory. If an optical fiber is actually cut, and spliced into an eavesdropping device, the potential presence of an unwanted listener is easily detected due to the interruption in the signal at the receiving station. However, more sophisticated techniques are available that allow tapping of a portion of the signal without interruption with such a small loss of power that the tapping goes undetected. One such technique involves forming a refractive index grating in the core of the fiber. Typically, the optical fiber in which the grating is written has a dopant that is sensitive to photoinduced refractive index change. Once written, the grating diffracts a portion of the signal wavelength through the side of the fiber, where it is then easily "read" by a photodetector located next to the fiber. The grating is produced by exposing a short length of the fiber core to suitable laser radiation to create bands of refractive index perturbations. This can be done without enough compromise of the bulk transmission characteristics of optical fiber to be detected.

Another technique, simpler in concept, is to form a bend in the fiber. This causes "leaking" of the signal into the optical fiber cladding where it can be intercepted without detection from the source or receiving stations.

BRIEF STATEMENT OF THE INVENTION

The first case of intrusion is dealt with according to the invention by constructing the optical fiber with a highly absorbing UV coating. This prevents access of the core of the fiber to the "writing" radiation necessary to form the grating. In one variation of this embodiment, one or more additional optical paths are provided in the optical fiber for monitoring signals. The added optical paths allow monitoring signals to be transmitted in the optical fiber, separate from the information signal, to signal any attempt to breach the cladding of the optical fiber.

The second case of intrusion is addressed by increasing the sensitivity of the optical fiber to microbending loss to the extent that bends in the fiber cause such high attenuation of the signal that the bends do not go undetected at the receiving station.

DETAILED DESCRIPTION

Techniques are known in the art for tapping electromagnetic radiation from an optical fiber. See for example, U.S. Pat. Nos. 5,061,032; 5,832,156; and 5,850,302, which are incorporated herein by reference. When unauthorized, this corollary to well known wire tapping may be referred to herein as fiber tapping. The method described in these patents requires the writing of a blazed and chirped refractive index grating in the core of the fiber being tapped. Optical fibers carrying sensitive information over long transmission lines offer easy opportunities for access to the physical fiber by the unauthorized user. It is then not difficult to strip the cable jacket and write a tap grating in the core of the exposed fiber. The fiber coating may also be easily removed for this operation. Techniques are known for writing gratings through fiber coatings so even stripping the fiber coating may be unnecessary for fiber tapping. Since the amount of power tapped from the main signal may be kept low (but still sufficient to allow the signal to be read) signal power loss at the receiving station may be within the normal limits of the system and the breach therefore not detected.

Figure 1:
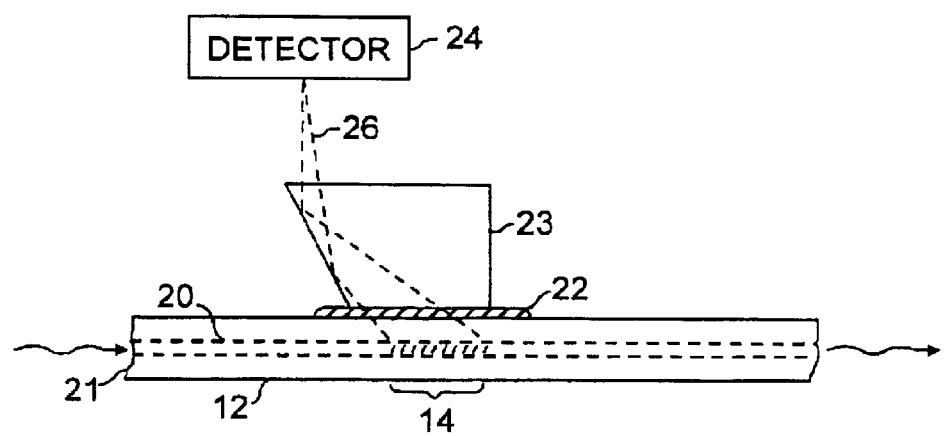
FIG. 1 is a schematic representation of one type of unauthorized fiber tapping technique.

The fiber tapping technique just described is illustrated in FIG. 1, where optical fiber 12 is shown with core 20 and cladding 21. This section of optical fiber is shown stripped of the usual optical fiber coating. A Bragg grating 14 is written into the exposed section of optical fiber by the unauthorized user. A small portion of the signal radiation traveling in the core 20 is diffracted from the core by the grating and is detected using a lens or prism 23 to focus the tapped beam 26 into photodetector 24. An index matching medium 22 may be used to increase the tap efficiency.

One way to prevent this form of fiber tapping, according to the invention, is to prevent access to the core of the fiber by the UV radiation required to form grating 14. This may be implemented, in one embodiment, by forming a highly UV absorbing cladding on the optical fiber. As mentioned earlier, the coating of the optical fiber is easily removed. The cladding is not. Physically, the cladding is a continuation of the core, and both form an integral glass body, with only small amounts of added impurities distinguishing the core from the cladding. Thus if the cladding is made impermeable to UV radiation, the core will not easily be accessed by the means necessary to form the fiber tap. This might be implemented by coating the optical fiber with a robust opaque material, such as a metal. But this approach is vulnerable to methods that include removing the opaque coating. Removing the coating may be easily accomplished without detection.

The preferred approach to implementing the prevention method of the invention is to incorporate UV absorbing centers into the body of the cladding glass. These cannot be removed without removing at least part of the cladding itself, which destroys or impairs the light guiding property of the fiber and would be easily detected. In one embodiment the absorbing centers are metal ions, for example, transition or refractory metal ions such as Ti, Zr, Fe, Ta, Ni, Co. The metal ions may be chosen to have high absorption of UV wavelengths used to write gratings, and lower absorption in the band of wavelengths of the optical signal, typically 1.3–1.6 microns.

Figure 2:
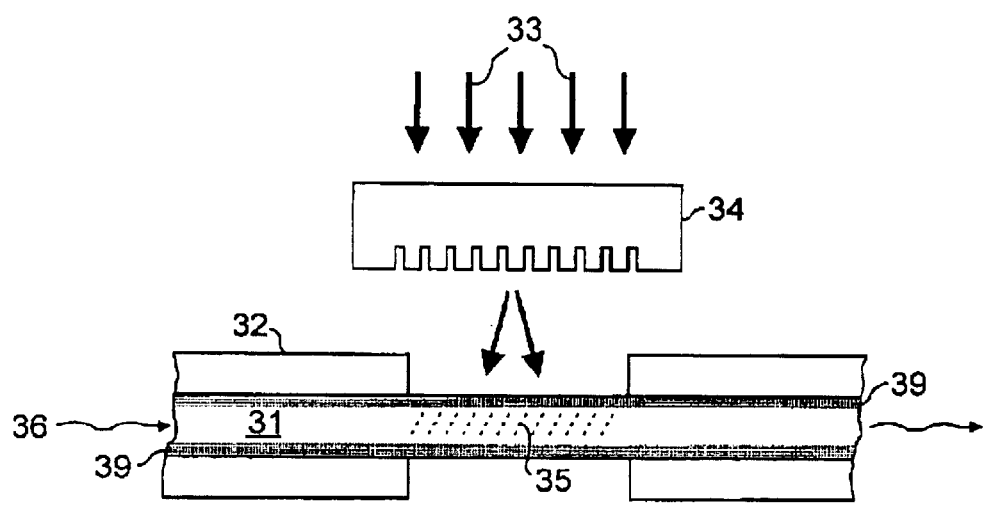
FIG. 2 is a schematic representation of a method used to implement the scheme of FIG. 1, and a prevention method according to one embodiment of the invention.

FIG. 2 illustrates the technique used in forming a typical refractive index grating, and the means of the invention for preventing use of this technique. A section of optical fiber 31 is shown with a portion of the optical fiber coating 32 stripped to expose the optical fiber. For clarity the core and cladding are not shown in this figure. The signal being transmitted by the optical fiber is represented by arrow 36.

The stripped portion of optical fiber is exposed to radiation from a UV laser, represented by 33, directed through a phase mask 34. This is a conventional and well-known process for forming gratings. The result is a refractive index grating 35 formed in the core. This grating corresponds to grating 14 in FIG. 1 and is the essential feature of this type of fiber tap.

The grating 35 is shown in phantom because in this embodiment of the invention, access to the interior or core of the optical fiber by the UV radiation from UV source 33 is prevented by UV blocking layer 39.

Absorption properties of various ions are well known. Also well known is that the absorption spectra show wide variations between wavelengths of interest here. One of the wavelength regions of interest is that used to form gratings in a germania doped optical fiber, i.e. 200–300 nm. The absorption peak of typical germania doped optical fiber is at 242 nm. Accordingly, to prevent effective writing of gratings using radiation in this wavelength region, the absorbing layer should have relatively high absorption in the wavelength range 200–300 nm. Correspondingly, it is preferred that the absorption layer have lower absorption in the wavelength of the signal, which typically will be in the wavelength region of 1300 to 1600 nm.

The following example is given for a dopant that meets these criteria.

Experimental data show that in alkali-silicate glasses, the absorption coefficient of nickel at 220 nm is about $1.5 \times 10^{10}$ dB/km per % nickel, and at 330 nm is about $1.4 \times 10^9$ dB/km. (Similar absorption spectra can be found for other metals.) Therefore, UV radiation at 200 nm will be attenuated by about 10–15 dB after transmission through 1 micron of silica doped with 1% Ni.

At the signal wavelength, 1300 to 1600 nm, the absorption coefficient of Ni is 3.6×107 dB/km per % Ni, which is approximately 400 times lower than the absorption at the wavelength being blocked, i.e. 200 nm.

Accordingly, a blocking layer (39 in FIG. 2) with a thickness of, for example, 1–20 microns doped with, for example, 0.1 to 5% Ni effectively prevents writing a grating necessary for a fiber tap. The doping level and the blocking layer thickness allow a tradeoff, with greater thickness of the blocking layer allowing lower doping, and higher doping allowing a thinner blocking layer and more separation between the blocking layer and the core as well as between the blocking layer and the cladding surface.

Selection criteria for the UV blocking ions also includes the diffusion coefficient of the blocking ions in a high silica, or pure silica, host. This is due to the fact that to effectively incorporate the blocking ions in the cladding of the optical fiber requires, in the typical case, that the ions be introduced at the preform stage. The possibility of diffusing ions into a drawn fiber to produce the blocking coating exists, especially for short fiber sections, but is commercially less attractive than treating the preform. It is desirable that blocking ions incorporated at the outer portion of a preform, diffuse slowly during heating (2000–2400° C.) of the preform for fiber draw. The cladding thickness of typical optical fiber is tens of microns. Accordingly, diffusion distance for the blocking ions can be up to 20 microns, but preferably below 10 microns, without detriment. Typical transition metal ions are expected to have diffusion properties that meet this specification.

Figure 3:
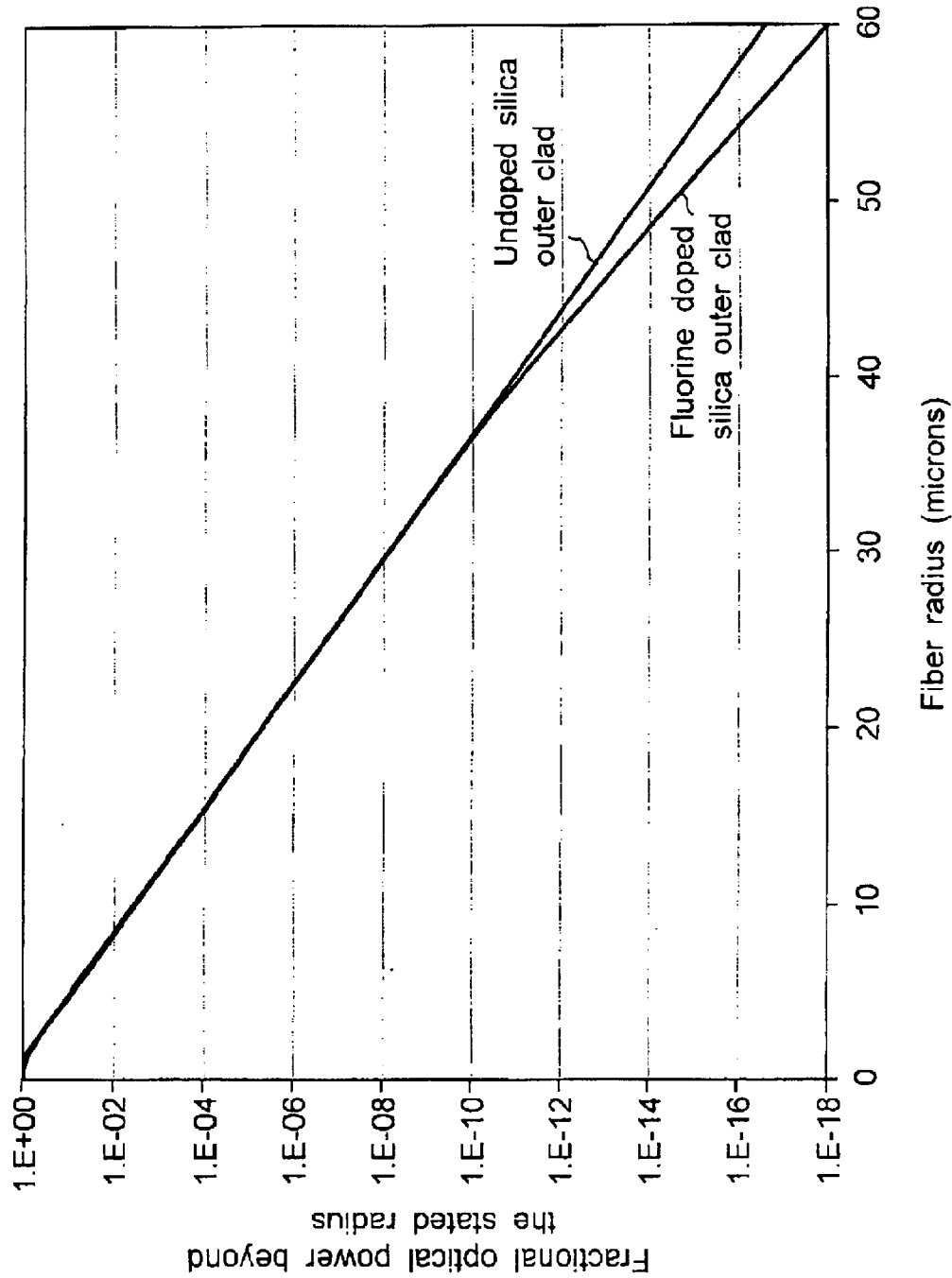
FIG. 3 is a plot of optical power vs. radius of the optical fiber showing the power distribution in the fiber.

In principle, the UV blocking layer 39 can be placed anywhere within the fiber cladding provided that its width is adequate to absorb enough UV radiation to prevent effective writing of a grating. Among the factors to be considered for blocking layer placement is the balance between separation between the blocking layer and the core to avoid attenuation of the signal, and the goal of burying the blocking layer as deep as possible to prevent its removal without disrupting the signal. The power at different locations across the optical fiber diameter can be calculated to aid in the proper placement of the blocking layer. FIG. 3 shows the optical power distribution at 1550 nm plotted vs. radial position in a typical optical fiber design.

The power distribution data show that $<10^{-11}$ of the total optical power at 1550 nm transmits at a distance greater than 40 microns from the fiber center. Therefore, if a barrier layer with an attenuation of at least $10^8$ dB/km at 1.3–1.6 microns is placed at a distance larger than 40 microns from the fiber center, it causes attenuation of less than 0.00 1 dB/km at the transmission wavelengths. Viewed another way, since the fiber core is typically less than 10 microns, a separation between the core and the blocking layer of at least 10 microns, or at least 20 microns from the center of the fiber, should easily be adequate to avoid excessive signal attenuation, while allowing a relatively large space for the blocking layer, and for space between the blocking layer and the surface of the cladding.

As mentioned above, the preferred method for fabricating the blocking layer incorporates absorbing ions into the preform prior to drawing the optical fiber. A typical preform with a 40 mm diameter and 1 meter long can be drawn into about 100 km of 125 micron diameter fiber. A UV blocking layer that is 320 microns thick in the preform will produce an approximately 1 micron thick blocking layer in the drawn fiber. Consequently, the thickness of the blocking layer in the preform stage is a few hundred microns to 8 mm, preferably in the range 100 microns to 8 mm, or even 16 mm. The latter translates into a blocking layer of approximately 50 microns.

The absorbing ions for the blocking layer can be introduced into the preform using any of the known techniques for preform preparation. A brief description of typical preparation approaches follows.

In a solution doping process a porous soot layer is deposited on the inside of a silica tube. See U.S. Pat. No. 5,123,940, which is incorporated herein by reference. A solution that contains the required transition metal ions is used to soak the porous soot layer. Upon drying, the soot layer is sintered and the transition metal ions are incorporated into the consolidated silica layer in the desired concentration. This operation may be carried out in one step, or in several steps, depending on the thickness and metal ion concentration desired for the blocking layer. To bury the blocking layer, a second layer of soot is deposited on the consolidated material just described, and consolidated without addition of metal ions. After preparing the cladding with the blocking layer, the core rod is inserted and the usual collapse performed. When the fiber is drawn from this preform, it contains the desired blocking layer.

Sol-gel methods may also be used for preparing preforms incorporating blocking layers. A typical overclad tube made by sol-gel has an outside diameter of for example 40 mm with a typical inside diameter of 24–32 mm. The transition metal ions can be easily incorporated in the sol-gel by adding a metal salt or hydroxide to the sol solution. The doped gel tube is then sintered and used to overclad a core rod to form the preform. Incorporation of dopants in a silica sol-gel body may follow the well-known approaches used for germanium doping. See for example, U.S. Pat. No. 5,379,364, which is incorporated herein by reference.

As described above, unauthorized and undetected fiber tapping may also be achieved using the bend method. The fiber is bent with a small enough bend radius that radiation leaks from the fiber core through the cladding. This is a well known fiber loss mechanism, and a wide variety of techniques are used to avoid microbending losses. However, an intentional bend with a small bend radius will induce loss of signal in nearly any commercial fiber.

According to the invention, the opposite of the usual objective is practiced. Here the desire is to increase the bend sensitivity of the optical fiber, so that any bend that will cause sufficient leakage for detecting the information in the signal, will cause such a large signal attenuation that it will be easily detected at the receiving station. It has been discovered that a high bend sensitive fiber can be produced by introducing an undoped outer ring region at a substantial distance from the fiber core. Furthermore, such bend sensitive designs do not adversely impact the transmission properties, provided the fiber cable is installed to have a large minimum bend radius.

Figure 4:
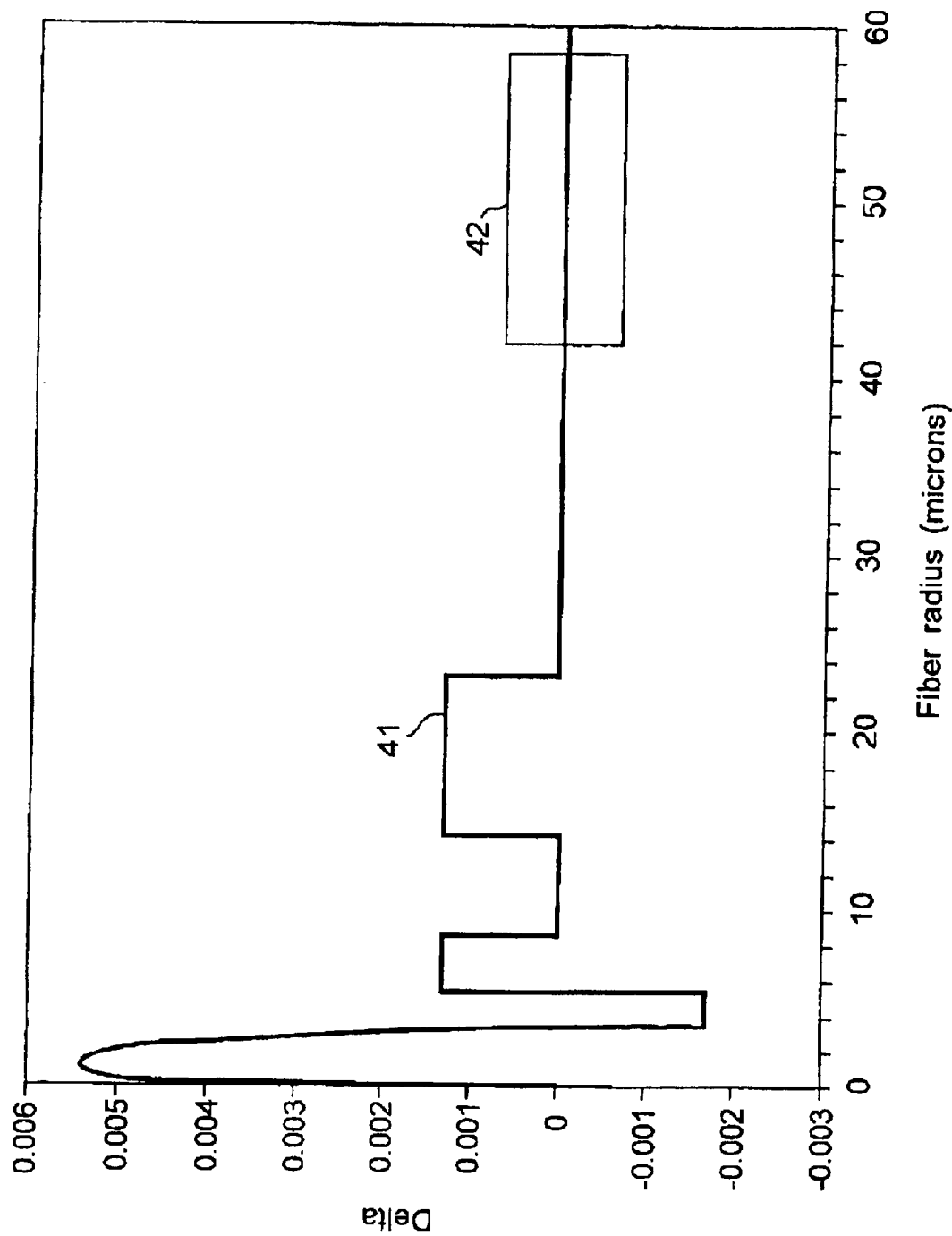
FIG. 4 is a refractive index profile for an optical fiber designed to prevent unauthorized tapping using a microbending method.

FIG. 4 shows schematically a bend sensitive fiber design. In a typical dispersion-managed fiber design the radial index profile typically consists of an up-doped core region, surrounded by a down-doped trench region, then an up-doped ring region. In the profile shown, the core, trench region and ring region extend to a radius of approximately 8 microns. The refractive indices in these regions are characterized by a delta that may be defined generally as $(N-N_o)/N_o$ where N is the index of a region, and $N_o$ is the index of undoped silica. In a typical dispersion-managed design, where the delta of each region is identified as $\Delta_1$, $\Delta_2$, and $\Delta_3$, respectively, the delta values are:

$0.003 < \Delta_1 < 0.012$ $-0.007 < \Delta_2 < -0.0002$ $0.001 < \Delta_3 < 0.006$.

The next region in the figure, extending between 8 microns and 14 microns, is an undoped layer. Following the objective of this embodiment of the invention, the bend sensitivity of the fiber design is made much greater by adding an outer up-doped region. In FIG. 4, the outer up-doped region is shown at 41. The region 41 has a preferred index range of $0.0005 < \Delta_4 < 0.0034$, and a preferred location ranging between 12 and 26 microns from the fiber center.

Figure 5:
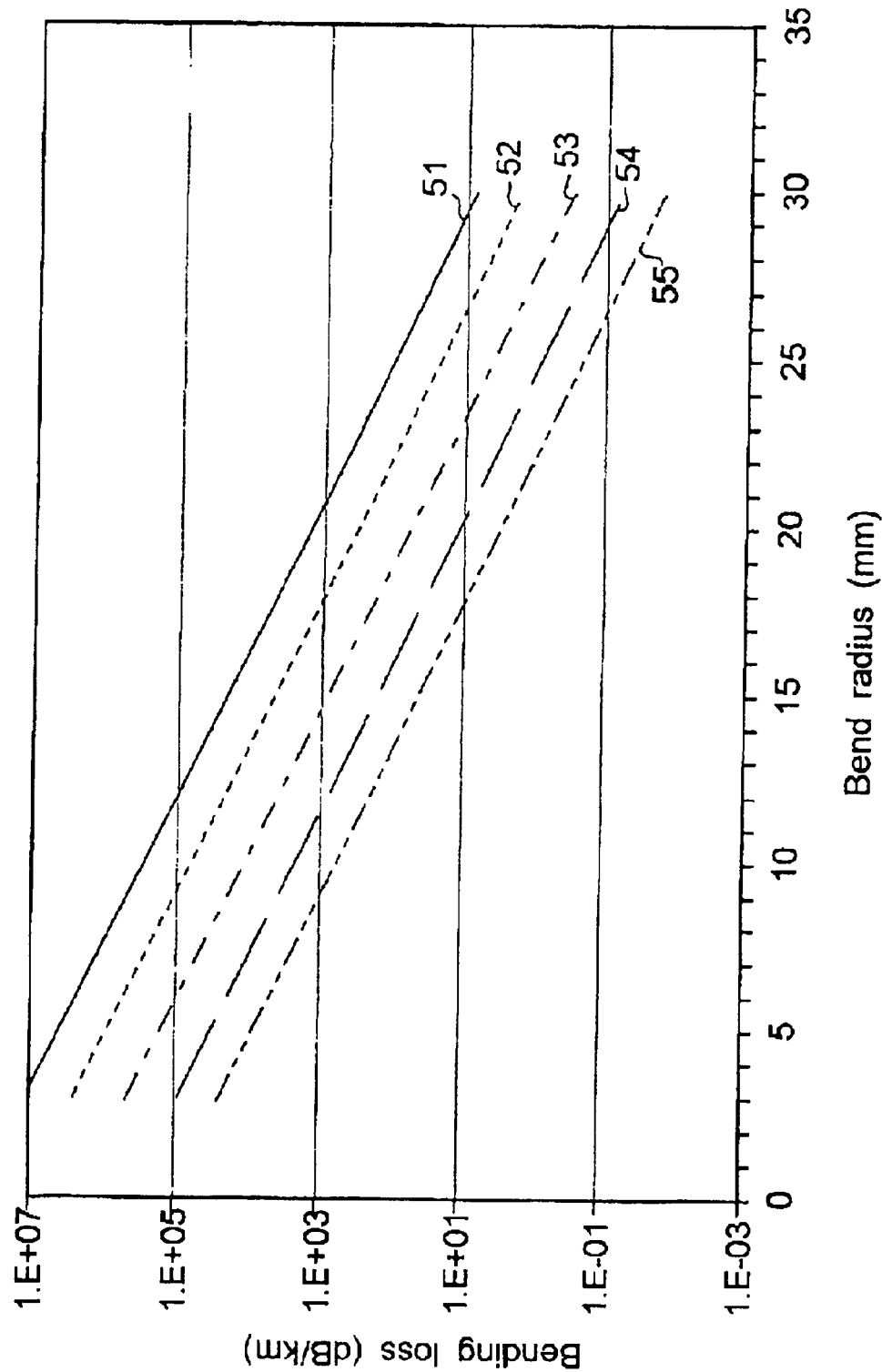
FIG. 5 is a plot of bending loss vs. bending radius for five different optical fiber index profiles.

FIG. 5 shows bending loss vs. bend radius at 1550 nm in fiber designs having different index $\Delta_4$ in the outer ring region. The five lines 51–55 give data for N=0.0025; N=0.0020; N=0.0012; N=0.0; and N=−0.0012, respectively. The figure shows that as the outer ring delta increases from −0.00082 to +0.00171, the bending loss increases by a factor of greater than 500. In fiber taps that employ bending the fiber, as disclosed in U.S. Pat. No. 4,802,723 (which is incorporated herein by reference), the radius of curvature of the bent fiber is related to the angle $\alpha$ between the fiber and bent tube and the distance x between the fiber-tube contact and the tube bent joint by $R = x/\sin(\alpha/2)$. The bent fiber length is given as $\alpha R$ or $x\alpha/\sin(\alpha/2)$. For x=10 mm, $\alpha$=15 degree or 0.26 radian, R is 76.6 mm and the bent fiber length is 20 mm.

The up-doped layer that serves to increase the bending sensitivity can be made economically by overcladding a core rod using a tube that is doped with $GeO_2$ of the appropriate refractive index. The up-doped tube is commercially available and can be made by either a soot process or sol-gel method. After overcladding, the preform may be drawn to have the bending sensitive layer sandwiched between the transmission fiber core and the outer clad.

The bend-loss inducing up-doped layer is preferably located inside the UV-blocking layer, and an undoped silica layer is sandwiched between these two layers. Therefore the up-doped tube is used as the first overclad tube followed by an undoped overclad tube, and then overcladded by the tube that contains highly absorptive transition metal ions.

Physical intrusion into the optical fiber structure can be signaled according to another embodiment of the invention by disposing breach-detection channels in the cladding of the optical fiber. This expedient is useful, for example, for detecting attempts to remove the blocking layer and expose the core for writing a grating.

Diameters of breach-detection paths in a preferred case may be in the range 3 to 10 microns and the centers located between 85 microns and 95 microns from the fiber center. The breach-detection path has a radial index profile of either a high index and small core diameter or a moderate index and large core diameter.

Wavelength calculations show that when the breach-detection path consists of 0.025 $\Delta$ within a 1.5 micron core radius, less than $10^{-11}$ of the optical power in the $LP_{01}$ fundamental mode leaks beyond 16.5 microns radius. This index profile will be single mode at 1.55 microns since the cutoff wavelength is at 1.25 microns.

When the breach-detection path consists of 0.015 $\Delta$ within a 5 micron core radius, less than $10^{-11}$ of the optical power in the $LP_{01}$ fundamental mode leaks beyond 17 microns radius. At 1.55 microns, in addition to the $LP_{01}$ fundamental mode, this index profile also supports the $LP_{11}$ and $LP_{02}$ higher order modes which have respective cutoff wavelengths of 3.2 microns and 2.0 microns.

Therefore, when the blocking layer is located further than 17 microns from the center of the breach-detection path of the above index designs, the blocking layer will not adversely attenuate the radiation in the breach-detection cores. However, the radial feature of a larger core diameter has the advantage of easier alignment when the optical fiber is spliced.

Breach-detection paths may be easily made by the sol-gel method used for the overclad tube. The gel body of the overclad tube can be made with a number of openings parallel to the longitudinal tube axis. Upon drying and partial densification, fully dense $GeO_2$-doped rods may be placed inside these openings. Upon complete densification of the overall tube, the $GeO_2$ doped rods will be incorporated to form the breach-detection light paths. Fiber drawing of this preform will result in breach-detection paths around the outer fiber circumference.

Figure 6:
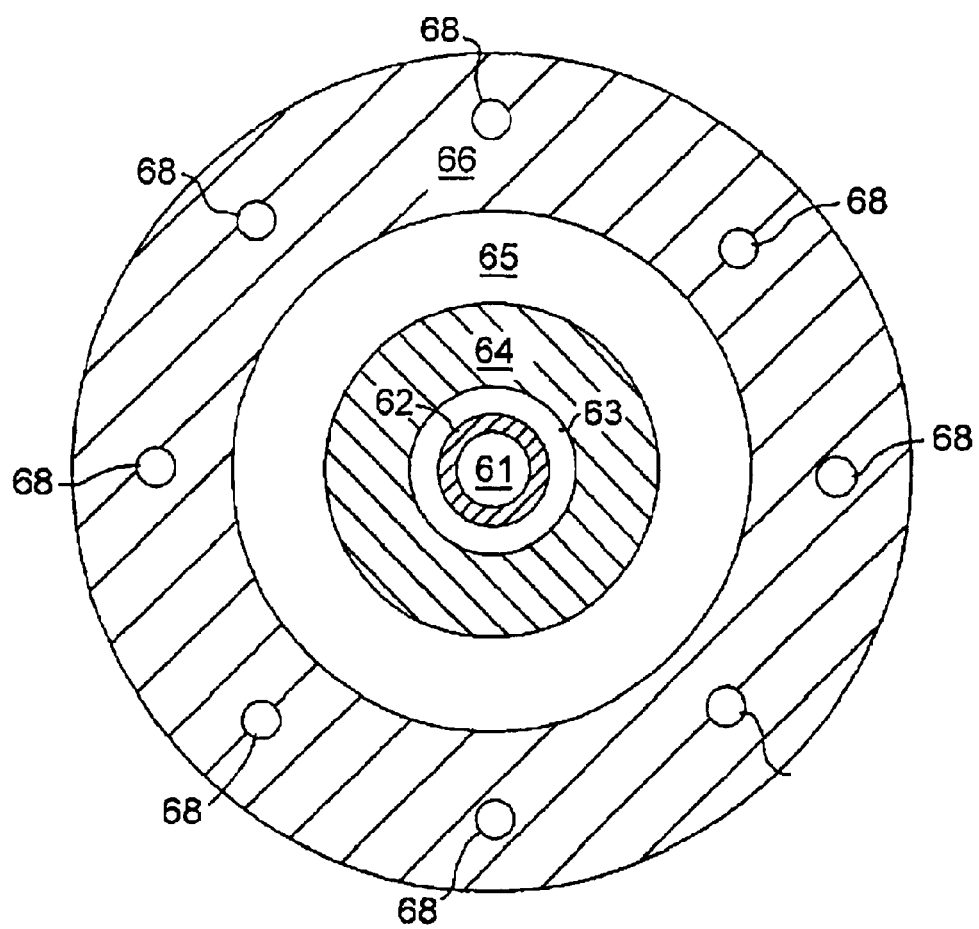
FIG. 6 is a schematic cross section of an optical fiber designed for preventing unauthorized tapping according to the invention.

FIG. 6 is an illustration of a fiber design employing three of the principles described above. The figure shows an optical fiber cross section with alternate layers sectioned (for clarity). The optical fiber core, typically doped with germania, is shown at 61. The primary cladding layer 62 is a silica layer, surrounded by an up-doped layer 63 for increasing the bend sensitivity of the fiber. Layer 64 is a silica layer, surrounded by layer 65 which is a UV blocking layer. Layer 66 is the outer cladding layer of, for example, silica. In this embodiment, layer 66 incorporates breach-detecting channels 68.

The fiber design illustrated by FIG. 6 employs all three embodiments of the invention. However, fibers of the invention may employ one, or two, of these embodiments. The use of the blocking layer, and the breach-detection paths are coupled in the sense that a recommended use of the breach-detection paths is to detect an unauthorized user trying to frustrate the blocking layer by physically removing a portion of the cladding.

In the course of the development of the invention it became evident that there is an advantage in using a larger fiber than the 125 micron fiber most commonly used. This is partly due to the fact that the security enhancing expedients of the invention involve adding layers to the basic optical fiber structure. That is especially the case with the fiber structure of FIG. 6, which has three added structural components. The breach-detection paths especially may be implemented using a fiber diameter larger than 125 microns. As an example, a 200 micron fiber may have a core, trench, and ring regions of conventional dimensions, i.e. the similar to those in 125 micron fiber, with breach-detection paths centered at 81.25 microns from the center, and the inner radius of the highly absorptive layer at approximately 40 microns from the center. An intruder will be compelled to remove the highly absorptive layer by grinding the fiber surface parallel to the fiber longitudinal axis such that a proper phase-mask can be placed for grating formation in the fiber core. With these fiber dimensions, the grinding process will destroy at least 34% of the breach-detection paths and will cause about 4.7 dB light intensity reduction transmitted by these paths.

The optical fiber design shown in FIG. 6 has eight added breach-detection paths. Obviously more, or fewer, may be used. At least three would be considered desirable.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An optical fiber comprising;
   (a) a center core, the center core being transparent to signal radiation of wavelength $\lambda_1$ and having a dopant concentration sensitive to radiation of wavelength $\lambda_2$ to produce a photoinduced refractive index change,
   (b) a cladding layer surrounding the core, the cladding layer comprising:
      i. a first silica glass cladding region with a refractive index lower than that of the core,
      ii. a blocking layer formed on the silica glass region, the blocking layer being capable of absorbing radiation having wavelength $\lambda_2$, and
      iii. a second silica glass cladding region with a refractive index lower than that of the core.

2. The optical fiber of claim 1 wherein the blocking layer comprises metal ions.

3. The optical fiber of claim 2 wherein the metal ions comprise Ni ions.

4. The optical fiber of claim 1 wherein the cladding has at least one additional core region, incorporated in the cladding, the additional core region having a refractive index greater than the cladding.

5. The optical fiber of claim 4 wherein the cladding has at least three additional core regions.

6. The optical fiber of claim 1 wherein the blocking layer has a higher absorption at $\lambda_2$ than at $\lambda_1$.

7. An optical fiber wherein the optical fiber has a refractive index profile viewed radially from the center of the fiber comprising:
   (a) an up-doped region;
   (b) a down-doped region;
   (c) an up-doped region;
   (d) an undoped region;
   (e) an up-doped region; and
   (f) an undoped region.

8. The optical fiber of claim 7 wherein region (a) has a $\Delta$ between 0.003 and 0.012, region (b) has a $\Delta$ between −0.007 and −0.0002, region (c) has a $\Delta$ between 0.001 and 0.006, and region (d) has a $\Delta$ between 0.005 and 0.0034.

9. The optical fiber of claim 7 wherein region (e) is spaced from the center of the optical fiber by a distance in the range 12–26 microns.

10. The optical fiber of claim 7 further including a blocking layer formed in the cladding, the blocking layer being capable of absorbing radiation in the wavelength range 200–300 nm.

11. The optical fiber of claim 10 wherein the cladding has at least three additional core regions incorporated therein, the additional core regions having a refractive index greater than the cladding.

* * * * *